United States Patent [19]

Hyde

[11] Patent Number: 5,550,694
[45] Date of Patent: Aug. 27, 1996

[54] MAGNETIC MEMORY DISK STORAGE SYSTEM

[75] Inventor: Darryl L. Hyde, San Jose, Calif.

[73] Assignee: Western Digital Corporation, Irvine, Calif.

[21] Appl. No.: 90,809

[22] Filed: Jul. 12, 1993

[51] Int. Cl.⁶ .................................................. G11B 5/48
[52] U.S. Cl. ................................................... 360/104
[58] Field of Search ........................... 360/104, 97.01, 360/103, 98.01, 106, 105, 97.02, 97.03

[56] References Cited

U.S. PATENT DOCUMENTS

| | | | |
|---|---|---|---|
| 4,829,395 | 5/1989 | Coon et al. | 306/104 |
| 5,003,420 | 3/1991 | Hinlein | 360/104 |
| 5,021,905 | 6/1991 | Sleger | 360/97.01 |
| 5,095,396 | 3/1992 | Putnam et al. | 360/106 |
| 5,161,074 | 11/1992 | Forbord et al. | 360/104 |
| 5,184,265 | 2/1993 | Foote et al. | 360/104 |

FOREIGN PATENT DOCUMENTS

| | | | |
|---|---|---|---|
| 1-253876 | 10/1989 | Japan | 360/106 |
| 4-358388 | 12/1992 | Japan | 360/104 |

OTHER PUBLICATIONS

IBM Technical Disclosure Bulletin (vol. 28, No. 6, Nov. 1985).

*Primary Examiner*—Stuart S. Levy
*Assistant Examiner*—Allen Cao
*Attorney, Agent, or Firm*—Leo J. Young; James A. Ward

[57] ABSTRACT

A magnetic memory disk storage system has a pair of storage disks rotatably mounted in a housing. A head actuator assembly is pivotably mounted adjacent to the storage disks and includes a plurality of load beam assemblies for placing read/write heads adjacent to the disk surfaces. Each of the load beam assemblies has a load beam, a magnetic recording slider adjacent an outboard end of the load beam, an actuator arm welded to the inboard end of the load beam and two alignment ears on the actuator arm. A pivot bearing assembly extends through pivot holes through the load beam assemblies for pivotable support of the head actuator assembly. The load beam assemblies are clamped together with the alignment ears on all of the load beam assemblies being in alignment. A torque washer next to the nut which clamps the parts on the bearing assembly includes a hole for resisting torque and preventing twisting of the load beam assemblies. The head actuator assembly is assembled from its component parts in a comb which protects the load beam assemblies and sliders during assembly, testing and transport.

1 Claim, 7 Drawing Sheets

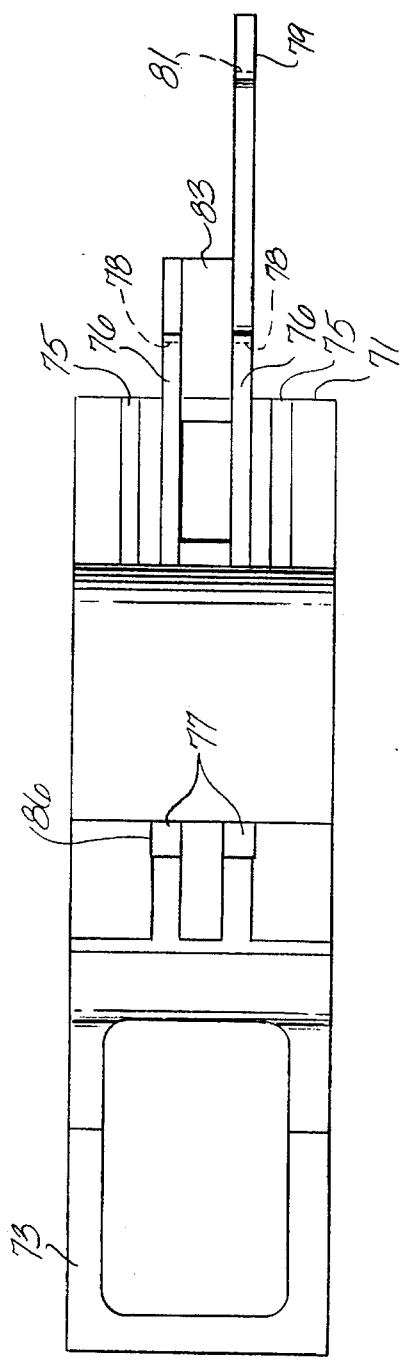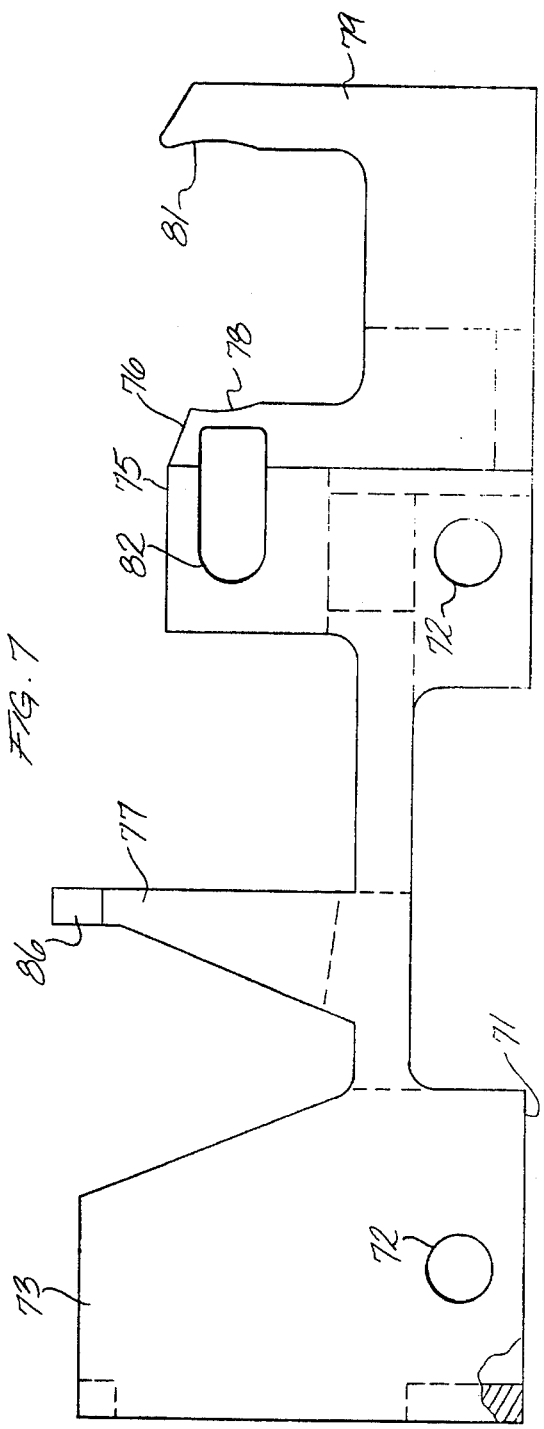

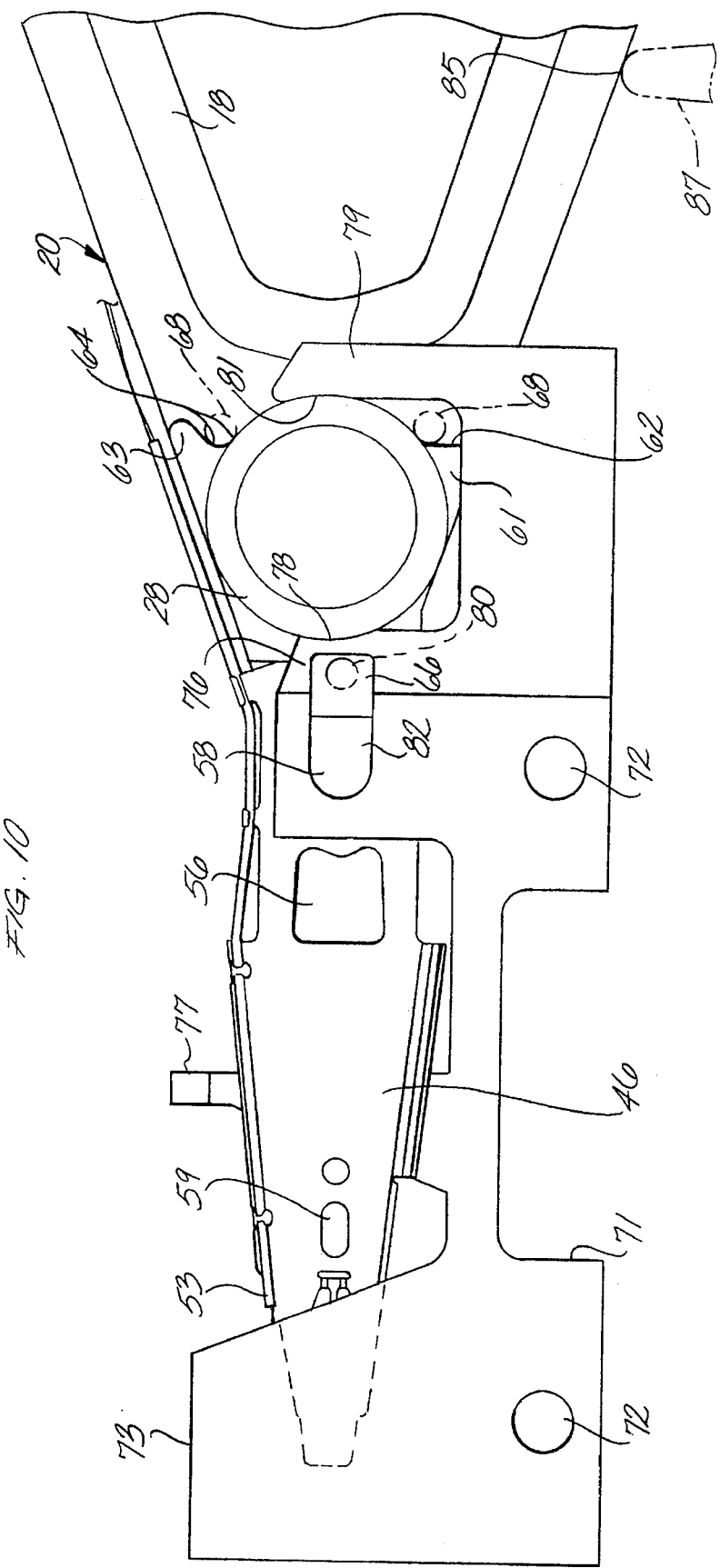

MAGNETIC MEMORY DISK STORAGE SYSTEM

BACKGROUND

This invention relates to the head actuator assembly for a rotating disk system for storing computer data on magnetic media. Such systems are sometimes known as hard disk drives. More particularly, the invention relates to the assembly of load beams for supporting magnetic recording heads adjacent to the disk surfaces.

Hard disk drives are essentially universally used for computers. In recent years, the disk drives have steadily decreased in size while at the same time increasing in storage capacity. Miniaturization of the magnetic memory disk data storage systems has presented significant challenges to the designer to provide systems that can be economically manufactured in large numbers with a high degree of reliability and maximum data storage capacity. The present invention meets at least some of such challenges for a generation of storage disks only 1.8 inches (4.5 cm.) in diameter.

An exemplary disk drive has a pair of flat circular disks spaced a short distance apart and rotating about a common axis. The surfaces of the disks are coated with a magnetic recording medium. Data are stored in the thin layers of magnetic medium by magnetizing small areas of the media. Typically, the stored data is divided into "tracks" that are concentric rings on the disk surface. A magnetic read/write head is positioned adjacent to each face of the disk. As the disk is rotated beneath the read/write head, it can magnetize the magnetic medium in the track, thereby writing onto the track, or it can read the magnetic pattern stored along the track for retrieving data. Each region along the track in which a bit of data is stored has become extremely small as disk dimensions have shrunk and the demands for higher disk capacity have been met. Furthermore, the width of the tracks in the radial direction has become smaller and smaller.

The magnetic read/write heads for a disk drive are supported at the outboard ends of what are known as load beams. The read/write head is in a "slider" on the end of the load beam. Each load beam is designed to press the slider toward the surface of the disk. When the disk is not rotating, the slider is pressed into contact with the disk surface. When the disk rotates, a film of air swept along by the rotating disk provides an air bearing between the slider and disk surface. The slider and read/write head "fly" or float on the air bearing an extremely small distance from the disk surface.

The four load beams (for an embodiment with two disks) are mounted together in a head actuator assembly which is pivotably mounted beside the rotating disks. When the head actuator assembly is pivoted, the outboard ends of the load beams sweep across the face of the disks for moving the sliders and read/write heads generally radially so that the read/write head is over a selected recording track. In this mounting arrangement, the length of the load beam is approximately tangential to the tracks.

An important feature of the head actuator assembly is that the sliders on the load beams are in alignment. In other words, it is important that the two sliders on opposite faces of the disk be at substantially the same radial position at all times.

Assume, for example, that one slider is at a shorter radial distance while the other is at a greater radial distance. When the two sliders are pivoted toward the axis of the disk, they will approach the spindle on which the disks are mounted. The one read/write head can record data closer to the spindle than the other head. On the other hand, when the head actuator assembly is pivoted toward the circumference of the disk, the slider that is radially further outward can record data closer to the circumference of the disk than the head which is out of alignment.

This means that potential inner tracks cannot be used on one face of the disk because one read/write head cannot approach the spindle as closely as the other head. Similarly, some tracks near the circumference will be lost on the opposite face of the disk where one of the heads cannot reach. As higher storage capacity is sought, it becomes more important to achieve closer alignment of the heads in the head actuator assembly. One cannot afford to lose the use of any available data tracks. Thus, means for readily obtaining and maintaining alignment of the sliders in a head actuator assembly is highly desirable.

A previous technique for forming a head actuator assembly having a plurality of load beams is described and illustrated in U.S. Pat. No. 4,829,395. In this assembly, a number of load beams are connected to a block by "ball staking." Part of the assembly has a boss with a passage having a narrow region. The boss is inserted in a mating hole and a ball is pressed through the passage. The ball has a larger diameter than the narrow region of the passage and swages the boss outwardly, thereby staking the parts together. Such a ball staking technique is also used in another embodiment of prior head assembly where the head actuator assembly has what amounts to an E-shaped block. Several load beams are ball staked to arms of the E-shaped block.

The ball staking essentially permanently attaches the load beam to the supporting block. This makes rework difficult in the event one of the load beams and the structure connected to it has a defect and needs to be replaced or removed for repair. Furthermore, when a ball staked part is removed, it becomes difficult to reattach and cracking of the metal may actually make it impossible. Thus, parts from such assembly may not be reusable. It would therefore be desirable to have load beam assemblies that could be disassembled for ease of repair and replacement.

It would also be desirable to have an assembly fixture which facilitates assembly and alignment of the load beam assemblies, and preferably, one that may have additional uses during the manufacture of a disk drive.

BRIEF SUMMARY OF THE INVENTION

There is, therefore, provided in practice of this invention according to a presently preferred embodiment, a magnetic memory disk storage system which has one or more data storage disks mounted in a closed housing. A head actuator assembly is pivotally mounted adjacent to such a storage disk and has a pair of load beam assemblies, with the two load beam assemblies of the pair each being adjacent one face of the storage disk. Such a load beam assembly has a load beam with an actuator arm welded to the inboard end and including pivot hole. A slider for a magnetic recording read/write head is mounted on an outboard of the load beam adjacent to a face of the disk for reading and writing data on the disk. At least one alignment ear is provided on the actuator arm. Preferably, there are two alignment ears with one having a V-shaped notch for aligning the load beam assembly both longitudinally and in a transverse direction.

These load beam assemblies are assembled on a pivot bearing extending through the respective pivot holes and are clamped together for forming a head actuator assembly. Instead of aligning the outboard ends of the load beams by tooling surfaces near the outboard ends, the alignment ears on the respective load beam assemblies are all in alignment with each other.

After such a stack of parts for a head actuator assembly is mounted on the bearings, a nut is threaded onto a portion of the bearing assembly for clamping the load beam assemblies together. A special washer is provided between the nut and load beam assemblies with a torque member for isolating the torque applied to the nut from the load beam assemblies, thereby preventing twisting of the load beam assemblies.

Clearly, such a combination can be readily assembled and disassembled and the sliders can be kept in close alignment.

BRIEF DESCRIPTION OF THE DRAWINGS

These and other features and advantages of the present invention will be appreciated as the same becomes better understood by reference to the following detailed description when considered in connection with the accompanying drawings, wherein:

FIG. 6 is a top plan view of a comb or assembly fixture for assembling a head actuator assembly;

FIG. 7 is a side elevation view of the comb fixture;

FIG. 10 is a semi-schematic side view indicating part of a head actuator assembly in the comb.

DETAILED DESCRIPTION

Figure 1:
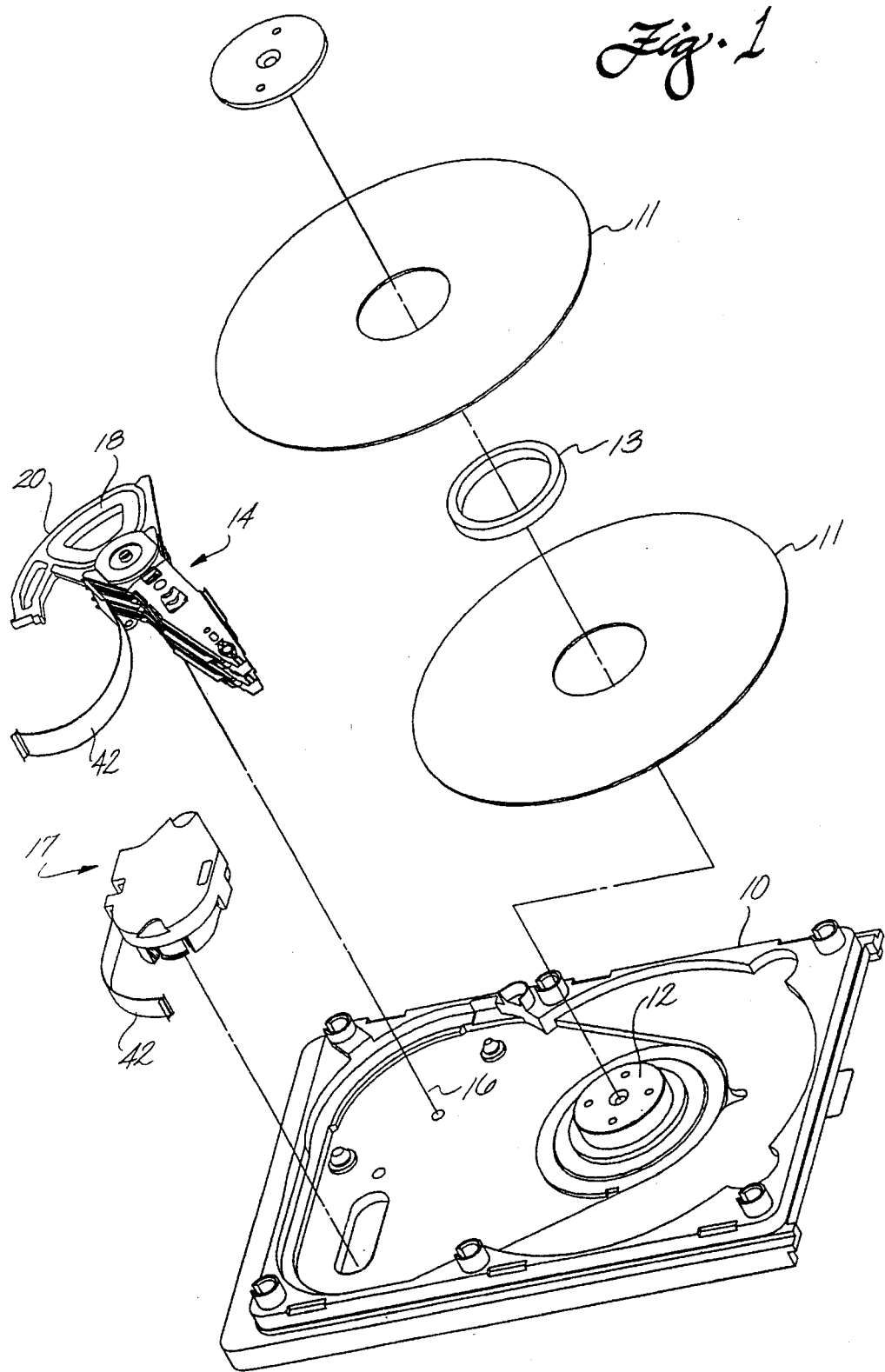
FIG. 1 illustrates in exploded perspective a magnetic memory disk storage system constructed according to principles of this invention.

High density hard disk drives have recording heads which lie at extremely close distances from the surfaces of the rotating disks. Thus, such a disk drive is sealed in a housing 10 which excludes all sources of dust or other contamination that could cause the head to crash against the disk surface. Only one half of such a housing is illustrated in FIG. 1, and neither the details of the housing nor the other half of the housing require any further description for an understanding of this invention.

In this embodiment, which represents a 1.8 inch (4.5 cm) diameter disk drive, there are two recording disks 11 rotatable about a common axis. Such a disk comprises a non-magnetic substrate, such as an aluminum alloy or glass, on the flat surfaces of which there is an extremely thin sputtered coating of conventional magnetic medium. Data are stored on such a disk by magnetizing tiny areas of the magnetic medium. The recording disks are secured to the spindle of a drive motor 12 with a spacer 13 between the disks to provide access for the recording heads.

Figure 2:
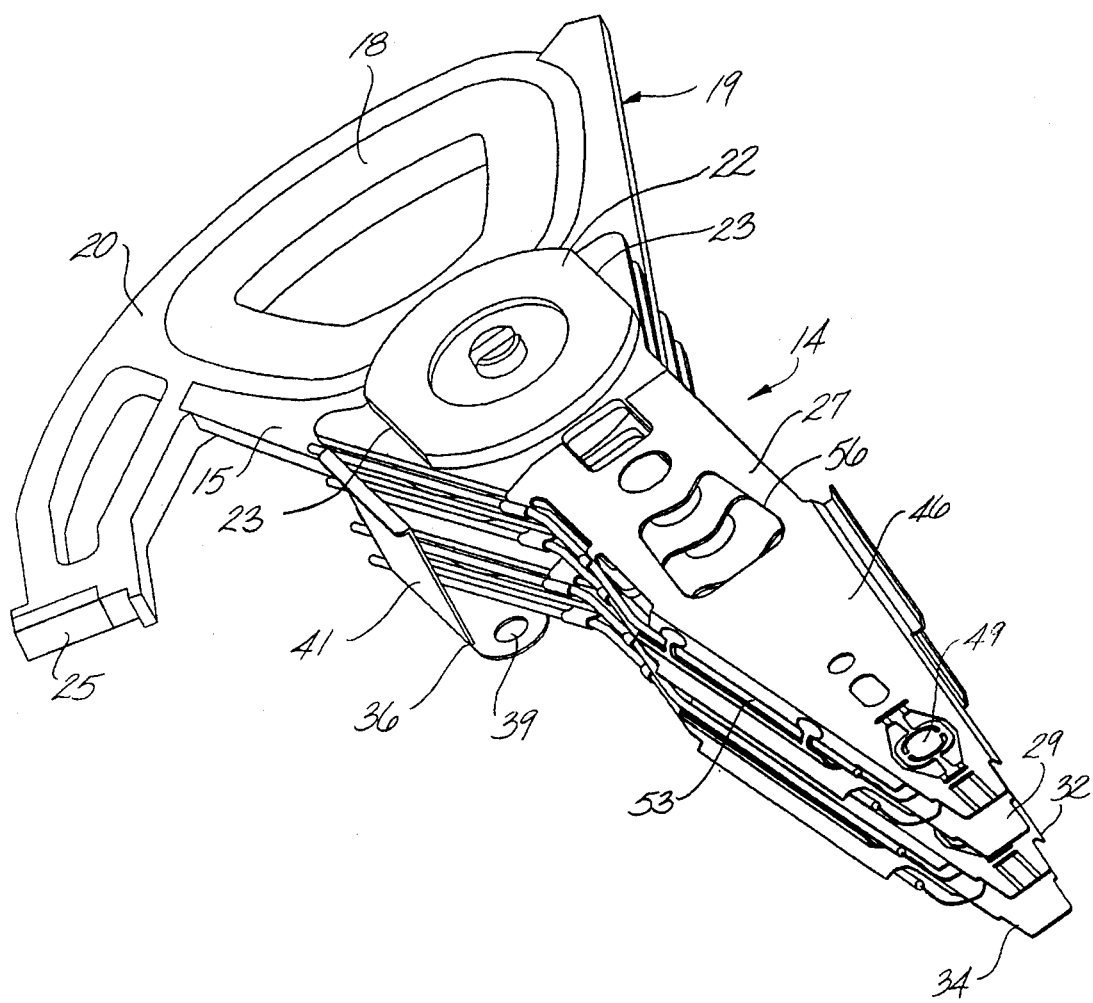
FIG. 2 is a perspective view of a head actuator assembly with a plurality of load beams.

A head actuator assembly 14 (illustrated enlarged in FIG. 2 and exploded in FIG. 3) is pivotably mounted in the housing adjacent to the disks. The pivot axis 16 of the head actuator assembly is positioned near the circumference of the disks so that when the head actuator assembly is pivoted to one extreme, the assembly is approximately tangential to the disks near their circumference. When pivoted toward its opposite extreme, the head actuator assembly is approximately tangential to the interior track on the disks near the spacer.

An interconnection and preamplifier module 17 is mounted in the housing. Also, a permanent magnet (not shown) is positioned beneath a coil 18 on an overmolded coil assembly 19 of the head actuator assembly. The "voice coil" actuator controls the pivoting of the head actuator assembly for reading or writing data on the disks. The inboard end 15 of the coil assembly is made of stainless steel and the coil is mounted in place nearer the outboard end by injection molded plastic 20. A steel latch piece 25 on the outboard end of the coil assembly pivots near a magnet (not shown) in the housing for latching the head actuator assembly in a safety position when the disk drive is turned off. Such a voice coil actuator for a disk drive is well known, as are other portions of the module such as input and output connectors, disk controllers, etc. and need not be described in greater detail.

"Inboard" refers herein to parts of the structure nearer the pivot axis of the head actuator assembly and its component parts, whereas "outboard" refers to parts of the structure further from the pivot axis and nearer the slider mounting end of the load beam assemblies.

Several parts are assembled onto a precision bearing assembly 21 to form the head actuator assembly. An end flange 22 on the outer race of the bearing assembly has flats 23 for receiving a wrench when the head actuator assembly is being clamped together. A threaded shaft 24 on the inner race of the bearing can be threaded into a hole in the housing at the pivot axis 16 for mounting the head actuator assembly in the housing.

The parts on the bearing assembly are sequentially as follows (FIG. 3): A first "down" load beam assembly 27 is located adjacent to the end flange 22. A spacer 28 which is essentially a washer separates the down load beam assembly from an "up" load beam assembly 29. These two load beam assemblies and the spacer form a set for reading and writing data on one of the disks.

The down load beam assembly has a slider 31, including a read/write head for reading and writing data on the top face of one of the disks (as illustrated in FIG. 1). This is referred to as the down load beam assembly since the spring action of the load beam presses the slider down toward the disk. Conversely, the up load beam assembly 29 has a slider 31 which is pressed upwardly toward the lower face of the disk.

The next part on the on the bearing assembly is the coil assembly 19.

Next, there is another set of load beam assemblies for reading or writing data on the second disk. This includes a down load beam assembly 32, a spacer 33 and an up load beam assembly 34. Finally, there is a torque washer 36 assembled on the outer surface of the bearing assembly.

Figure 5:
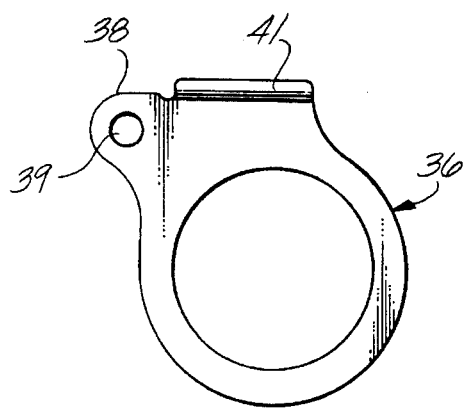
FIG. 5 is a plan view of a torque-limiting washer.
Figure 8:
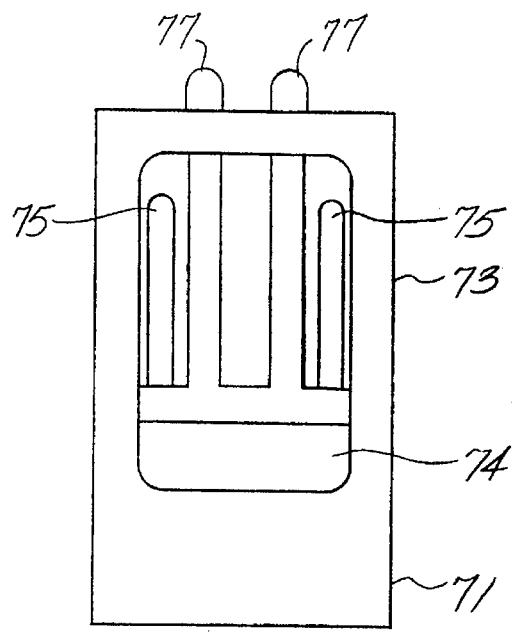
FIG. 8 is an end view of the comb from the left end of FIG. 7.
Figure 9:
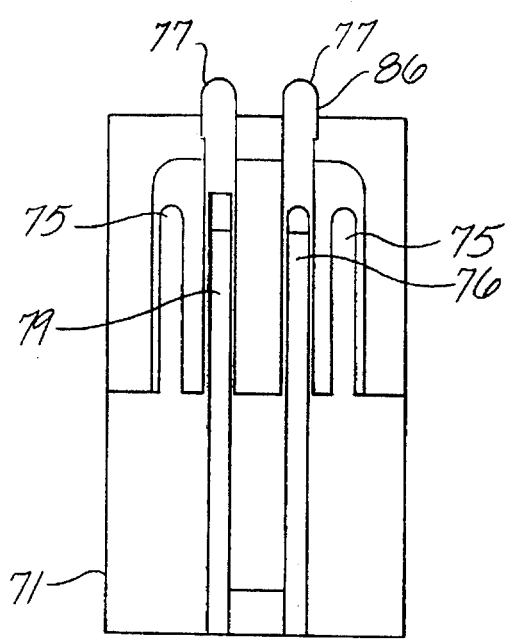
FIG. 9 is an end view of the comb from the opposite end.

The parts assembled onto the bearing assembly are then clamped together by tightening a nut 37. The nut bears against the torque washer 36, which is also illustrated in FIG. 5. The torque washer is not simply a round washer, but also has an ear 38 with a hole 39. The hole serves as a location for engaging the washer with a pin for resisting the torque applied to it by the nut as the nut is tightened. A hole is used so that it may also be engaged while the nut is being removed in the event the assembly is taken apart.

First, the load beam assemblies are aligned as described hereinafter. The hole in the washer is engaged to prevent rotation, and then the nut is tightened on the bearing assembly. Preventing rotation of the torque washer prevents the torque on the nut from twisting the end load beam assembly and thereby misaligning the sliders.

It will also be noted that the torque washer has an arm 41 normal to the plane of the washer. The arm serves as a location for fastening a ribbon cable 42 to the head actuator assembly for making electrical connections to the module 17 (FIG. 1).

Figure 4:
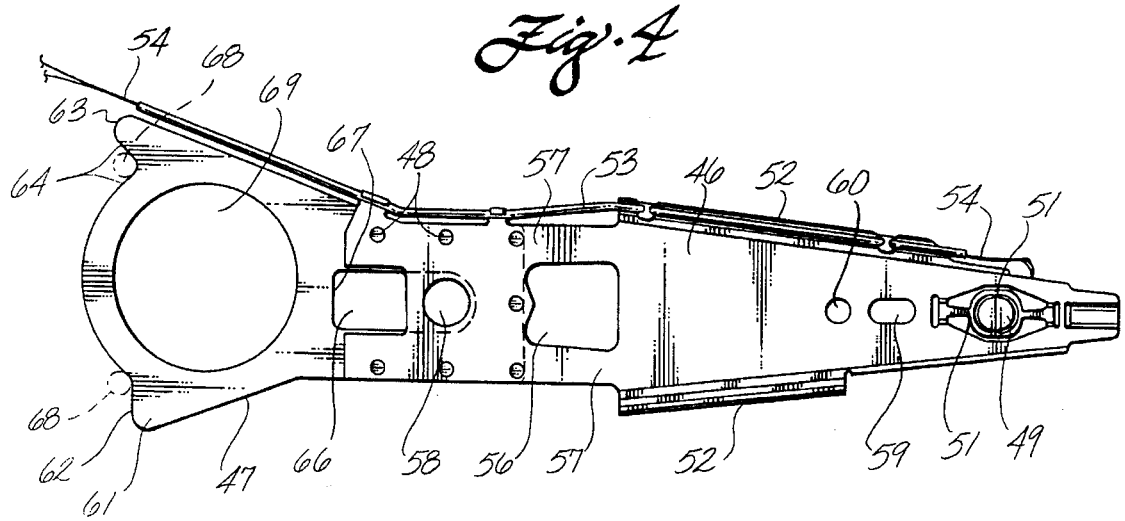
FIG. 4 is a plan view of one load beam assembly.

An exemplary load beam assembly is illustrated in plan view in FIG. 4. The load beam assembly comprises a thin stainless load beam 46 welded to a slightly thicker stainless steel actuator arm 47 by a plurality of spot welds 48. Near the outboard end of the load beam, generally arcuate holes are etched through the load beam to leave a roughly circular gimbal pad 49 in the center. A slider 31 (hidden by the load beam in FIG. 4) is mounted on the gimbal pad 49. Narrow webs of metal between the gimbal pad and the balance of the load beam can bend to provide gimbal pivots for the pad. One pair of webs is parallel to the axis of the load beam, and the other pair is transverse to the axis. Thus, the pad can roll or tilt in any direction so that the slider mounted on the pad can tilt or roll to fly at the appropriate attitude relative to the surface of the disk. Such a gimbal assembly is conventional.

Edge portions 52 of the load beam are bent out of the plane of the load beam in a direction away from the disk, for stiffening the outboard end of the load beam. Furthermore, one of the edge portions has tabs bent around an insulating tube 53 which extends along a principal portion of the load beam assembly. A pair of insulated wires 54 extend through the insulating tube to make electrical connection between the read/write head of the slider and the ribbon cable mounted on the arm of the torque washer.

A hole 56 through the load beam leaves webs 57 of metal nearer each edge of the load beam. These webs serve as a flat spring for biasing the slider toward the face of the disk at a selected preload. A tooling hole 58 and slot 59 or hole 60 through the load beam provide reference surfaces for tooling devices which are used for assuring that the slider is mounted on the gimbal pad at a predetermined location. These tooling surfaces are also used for aligning the load beam with the actuator arm 47 before spot welding, thereby aligning the slider with the actuator arm.

The actuator arm provides the primary location and orientation datum points for the load beam assembly. A first tab or alignment ear 61 at the inboard end of the actuator arm provides a datum surface 62 on the actuator arm and hence for the load beam assembly. A second tab or alignment ear 63 has a V-shaped notch adjacent to the inboard end of the actuator arm to provide two datum surfaces 64. An elongated opening 66 through the actuator arm provides a pressure surface 67 for use during assembly. The datum surfaces are on one side of the axis of the pivot hole and the pressure surface is on the opposite side of the pivot hole.

When a pressure is applied against the pressure surface, the actuator arm is biased towards a pair of circular tooling pins 68, which are illustrated in phantom since used only during assembly. The single datum 62 on the first tab prevents translation of the actuator arm in the direction of the length of the arm. Two datum surfaces 64 adjacent to the second tab prevent translation in the direction of the length of the load beam assembly, and also prevent translation of the actuator arm in a direction transverse to the length of the load beam assembly.

When the load beam assembly is mounted on the bearing assembly, the single datum surface prevents rotation in one direction of the actuator arm around the large hole 69 through which the actuator arm is assembled onto the pivot bearing assembly. The two datum surfaces 64 engaging the tooling pin 68 prevent rotation in the opposite direction around the large bearing mounting hole.

Circular tooling pins are used for contacting the datum surfaces at three points. Pressure against the pressure surface 67 tightly engages the three datum surfaces against the tooling pins and assures that the actuator arm is at a precisely known location and orientation.

An actuator arm is located as described against tooling pin 62 before spot welding the load beam to the actuator arm. The load beam is then positioned in a known location by means of the tooling hole 58, slot 59 and/or hole 60. After spot welding the load beam onto the actuator arm, the slider is thus precisely located relative to the datum surfaces 62 and 64.

If desired, the load beam may first be spot welded onto an actuator arm with reasonably good location and orientation, and then the load beam assembly can be clamped against tooling pins on the actuator arm for precise location of the slider onto the gimbal pad. Similar precise location can be provided by either sequence of making the load beam assembly. Welding the load beam on the actuator arm before mounting the slider may be preferred for several reasons. The precise location of the slider relative to the tabs on the actuator arm in a single step can reduce error or misalignment. The welded parts of the load beam assembly can be cleaned after welding and before the slider is attached. The slider and attached wiring are delicate and it is preferable to minimize handling of this part of the assembly in the manufacturing operation. The slider subassembly is also more costly and is preferably mounted after it is assured that the actuator arm and load beam are securely welded.

The three datum surfaces on the completed load beam assembly are then used during assembly of the several parts for making the head actuator assembly. By aligning the datum surfaces against similar tooling pins in an assembly fixture, the alignment of the sliders on the several load beam assemblies can be precisely maintained.

A head actuator assembly can be assembled, transported and tested in an assembly fixture or "comb" as illustrated in FIGS. 6 to 9. The comb is also illustrated semi-schematically in FIG. 10, with parts of a head actuator assembly in the comb to indicate how it is used. The comb is temporarily mounted on a tooling fixture (not shown) while a head actuator assembly is being assembled. Various tooling pins and blades are moved through or around the comb for temporarily supporting or aligning parts during assembly. "Wrenches" also approach the comb from either side for tightening the nut on the bearing assembly. Such collateral devices are generally not shown in the drawings, although their locations during assembly are indicated generally hereinafter.

The comb has a generally rectangular base 71. Holes 72 through the base may be used for temporarily mounting the comb on a tooling fixture or other assembly tools or aids. At one end of the base, there is a generally U-shaped box or frame 73 with a window 74 in the end. The frame surrounds the outboard ends of the load beam assemblies during assembly of a head actuator for protecting the read/write heads from damage.

At the opposite end of the base, there are four upstanding vanes 75, 76 parallel to each other and to the length of the comb. In between the vanes and frame are two fingers 77 parallel to each other and to the vanes. In effect, the vanes and fingers are teeth, which is the reason the assembly fixture is referred to as a "comb".

The two vanes 75 nearer the sides of the comb extend only to the end of the base. Each of the two inner vanes 76 extend beyond the end of the base. One of the inner vanes extends beyond the base a relatively shorter distance to a curved surface 78. The other inner vane also extends to a similar curved surface 78, and extends even further in the form of a hook 79 with an inside curved surface 81 opposite the first curved surface 78. The two curves 78 and 81 are arcs of a common circle having a radius the same as the external radius of a spacer (28 or 33 in FIG. 3) between load beam assemblies.

When the comb is used, a spacer is placed into the arcuate socket formed between the two curved surfaces 78, 81 on the vane with the hook 79. Another spacer is placed against the other curved surface 78, and may be held in place temporarily by a blade on the tooling fixture (not shown). A load beam assembly is placed adjacent to each face of each spacer. Thus, there is one pair of up load beam assembly and down load beam assembly straddling each inner vane 76. The pair of load beam assemblies also straddles one of the fingers 77. The fingers are thick enough that they keep the facing sliders of the two load beam assemblies from contacting each other. The outer vanes 75 help keep the load beam assemblies upright. A temporary tooling hole 82 through the vanes accommodates a transverse pin 80 which fits tooling holes 58 and/or 66 (FIG. 4) through the load beam assemblies for positioning of the load beam assemblies during assembly.

Figure 3:
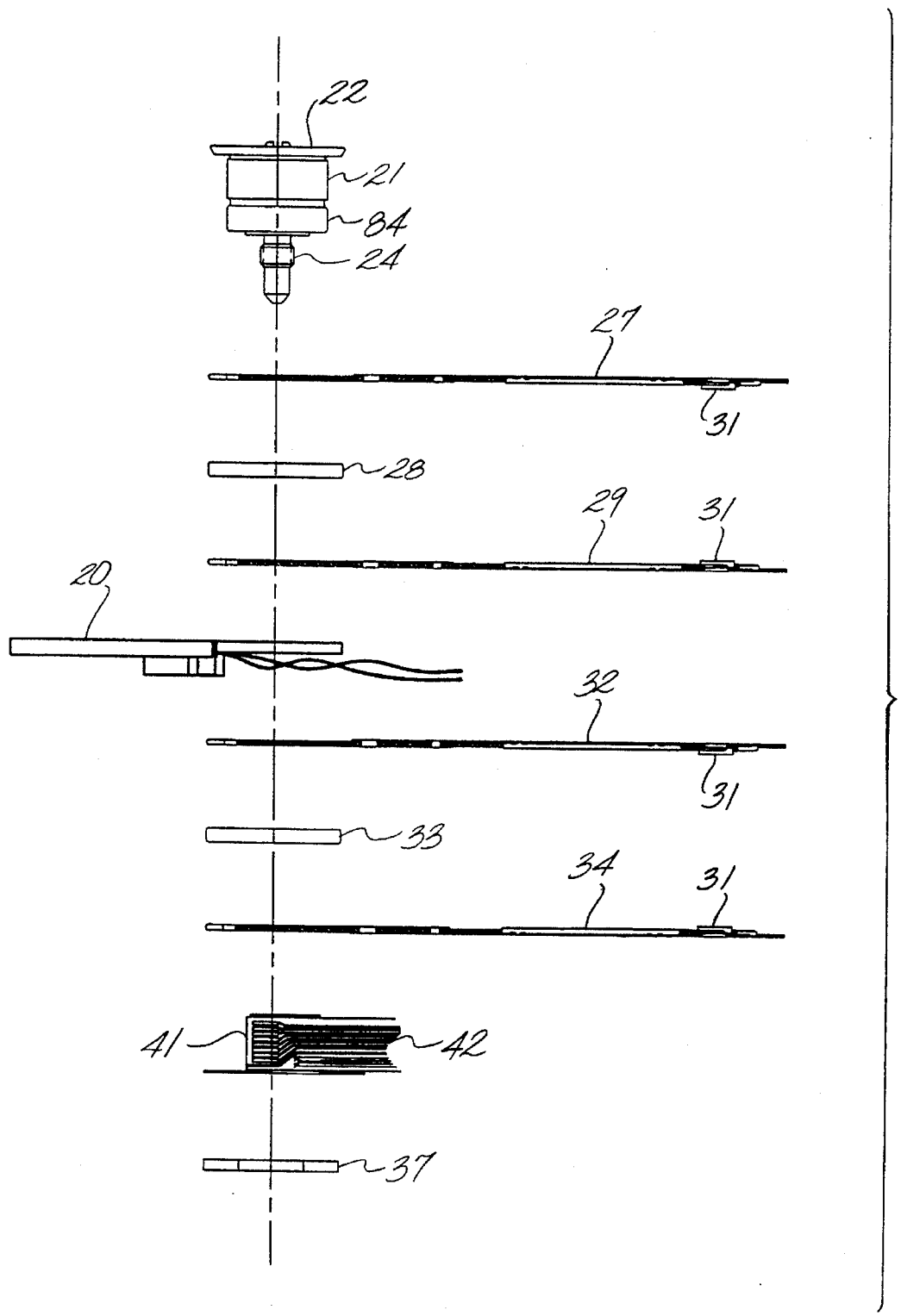
FIG. 3 is an exploded elevation view of the parts going into a head actuator assembly.

A coil assembly 19 (FIG. 3) is placed on the comb in the gap 83 between the inner vanes and between the adjacent load beam assemblies 29 and 32, as suggested by the exploded view of FIG. 3. A torque washer 36 is placed adjacent to one end of such a stack of parts in the comb. A bearing assembly 21 is then passed through the aligned pivot holes in the parts in the comb. A nut 37 is threaded onto a threaded portion 84 (FIG. 3) of the bearing assembly.

A pressure pin 80 is passed transversely through the openings 66 in the four load beam assemblies in the stack. The pin is moved laterally to press against the pressure surface 67. Preferably, the surface of the pin is coated with a resilient elastomer to assure contact with all four of the load beam assemblies. The pressure pin biases each of the load beam assemblies toward a pair of alignment pins 68 (FIG. 10) which also extend transversely into the comb adjacent to the stack of parts. One datum surface 62 on the actuator arm of each load beam assembly is pressed against one of the pins and the other datum surface 64 with the V-shaped notch encounters the other tooling pin. As previously indicated the three datum surfaces fix the alignment of the load beam assemblies in both the longitudinal and transverse directions.

A tooling point 85 on one edge of the coil assembly 19 has a known position with respect to the coil. When the coil assembly is placed in the comb, the tooling point rests against a blade 87 on the tooling fixture supporting the comb. The tooling point and the axis of the bearing assembly determine the angular position of the coil assembly relative to the load beam assemblies. This alignment must be fixed so that, as the voice coil actuator pivots the head actuator assembly, the sliders are opposite known data tracks on the disks.

When the load beam assemblies have been aligned against the pins 68 and the coil assembly is aligned against the tooling point 85, the nut is tightened on the bearing assembly for clamping the parts in the stack tightly together. A pin (not shown) engages the hole 39 in the ear on the torque washer 36 for restraining the washer from rotating. Thus, the frictional engagement of the nut on the stack of parts is against a torque washer and the torque washer is prevented from rotation, thereby preventing the load beam assemblies from being twisted out of alignment or damaged.

An alternative technique may be used for aligning the load beam assemblies in the head actuator assembly. The pivot bearing assembly may serve as one reference or datum. The large pivot holes through the actuator arm fit closely on the outer race of the bearing assembly. An alignment pin (not shown) extends transversely through the comb through the slots 59 or holes 60 near the outboard ends of adjacent load beam assemblies. The engagement of the pin with the slot or hole determines the angular position of the load beam assemblies on the bearing.

If desired, the pin may be pressed toward the pivot bearing to bias the load beam assemblies toward the bearing and minimize the differences in distance between the pivot bearing axis and slider. This distance is less important than angular position of the slider, and this much of the alternative alignment technique is optional.

The assembly of parts into the comb has been described in a sequence convenient for understanding of the assembly. The sequence of placing the parts in the comb actually employed may differ for convenience.

Once the nut is tightened on the bearing assembly the head actuator assembly is essentially complete. All that is left is soldering the wires 54 to the ends of the traces on the ribbon cable 42. Leads (not shown) from the coil 18 on the coil assembly are also soldered to the ribbon cable. These final steps are accomplished while the head actuator assembly is mounted in the comb.

The head actuator assembly is also tested while mounted in the comb. This assembly is held by reason of the curved surfaces 78 and 81 on the inner vane and hook, respectively, engaging one of the spacers between a pair of load beam assemblies. This permits the head assembly to be pivoted so that the load beam assemblies swing laterally beyond the two fingers 77.

It may be noted that the ends 86 of the fingers are slightly enlarged for resiliently retaining the load beams in the comb and minimizing inadvertent pivoting.

Once pivoted out of the comb the sliders on the ends of the load beam assemblies can be tested to verify some of their functional parameters. Once testing is completed the head actuator assembly can be pivoted back into the comb which is then used as a protective housing and support for transport and storage of the head actuator assembly until ready to be placed in the disk drive. Assembly into the disk drive housing is preceded by transfer of the head actuator assembly from the comb to a conventional assembly aide.

When it is desired to remove the comb from the head actuator assembly, the comb is simply pulled off the assembly. The hook 79 deflects slightly to release from the spacer. If desired a complete head actuator assembly can be easily snapped into a comb for testing, repair or storage. The assembly is simply pushed in place with a spacer between a vane and hook by essentially the reverse of removal. The rounded ends on the fingers 77 force adjacent load beam assemblies apart when the head actuator assembly is moved into the comb. Returning a head actuator assembly to a comb may be desirable in the event the assembly needs to be disassembled for repair or replacement of parts.

The combs are reusable, and if desired, may be cycled from the final disk drive assembly facility back to the facility where head actuator assemblies are built.

Although limited numbers of variations of the head actuator assembly and techniques for assembling the apparatus have been described and illustrated herein, it will be apparent to one skilled in the art that many modifications and variations may be made. For example, a number of slots, holes and tooling surfaces have been employed in the load beam assemblies for alignment during various stages of manufacture. The locations and shapes of these may be varied as deemed appropriate for a specific disk drive. Such arrangements would, for example, almost certainly be different for a disk drive having a diameter different from the 1.8 inch diameter of the illustrated embodiment.

In this embodiment the load beam assemblies, inboard end of the coil assembly, spacers, bearing outer race and nut are all made of stainless steel so as to have the same coefficient of thermal expansion. If desired, the parts may be made of aluminum alloy, but it is preferable that all of the parts be made of the same alloy so that there is a uniform coefficient of thermal expansion.

Because of such variations it will be apparent that within the scope of the appended claims, this invention may be practiced otherwise than as specifically described.

What is claimed is:

1. A magnetic memory disk storage system comprising:

a housing;

at least one rotatable magnetic memory storage disk mounted in the housing;

an actuator assembly pivotably mounted adjacent to the storage disk and including at least a pair of load beam assemblies, with one load beam assembly of the pair adjacent each face of such a storage disk;

each such load beam assembly comprising:
 a load beam,
  a magnetic recording slider adjacent an outboard end of the load beam adjacent a face of the disk for reading and writing data on the disk,
  an actuator arm welded to the inboard end of the load beam and including a pivot hole, and
  an alignment ear on the actuator arm;

a pivot bearing assembly extending through the pivot holes of the load beam assemblies for pivotal support of the actuator assembly;

a nut threaded on a portion of the bearing assembly for clamping the load beam assemblies together on the bearing assembly with the alignment ears on the actuator arms of all of the load beam assemblies in alignment with each other; and a washer between the nut and the load beam assemblies, the washer including:
 a torque resistance member for isolating torque of the nut from the load beam assemblies, and
 a connection arm transverse to the plane of the washer; and a flexible ribbon cable connected to the connection arm and including electrical conductors for making electrical contact with the slider.

* * * * *